United States Patent Office 2,829,062
Patented Apr. 1, 1958

2,829,062

REFRACTORY VITREOUS CERAMIC COATING MATERIALS

Dwight G. Bennett, Champaign, and William J. Plankenhorn, Lombard, Ill., assignors to the United States of America as represented by the Secretary of the Air Force No Drawing. Application February 7, 1956
Serial No. 564,092

4 Claims. (Cl. 106—48)

This invention relates to refractory vitreous ceramic coating materials, and more particularly relates to new coating compositions for use with stainless steel whereby protection against oxidation and corrosion is provided at elevated temperatures. In one of its aspects this invention relates to new and novel frits which are utilized in preparing the refractory vitreous ceramic coating materials. This invention also relates to a new article of manufacture comprising a stainless steel structural member, a surface of which is bonded to the novel ceramic coating applied as a protective layer thereover.

The need for structural materials capable of withstanding prolonged exposure to high operating temperatures has become greatly emphasized in recent years with the development of jet propulsion and rocket engines. The availability of suitable metals for the construction of combustion chambers and related components has been limited and considerable research has been undertaken for improving the heat resistance properties of the available structural materials. One approach to the problem has been the application of ceramic coating materials as a protective layer over the surface of the available metals which are most suitable for the stated purposes. It has been found, for example, that the metallic member coated with various ceramic coating materials may be significantly protected during high temperature operation against oxidation and corrosion whereby the mechanical strength of the member may be maintained for a longer period of time. In some cases, the protection afforded the metallic member by the ceramic coating has made possible the use of somewhat higher operating temperatures than could be otherwise tolerated by the non-treated metallic surface since most of the strength properties of the metal are beneficially affected.

Although varying degrees of success have been attained by this approach, the use of the prior art ceramic coating materials has not proven entirely satisfactory due to serious limitations imposed upon the ceramic coating compositions by the high temperature and other operational requirements. For example, it is essential that the ceramic coating formulations generally comprising a frit and mill additions therefor contain ingredients which are capable of withstanding the extremely high temperatures without causing disintegration of the ceramic coating material or undesirable reactions with the metal surfaces over which it is applied. Preferably, the coating composition should not give rise to poisonous fumes at the elevated temperatures which create hazards to personnel during the preparation and application stage and also to persons who may become exposed to the fumes during operation of the aircraft utilizing the treated metal components. Furthermore, extreme difficulties have been experienced in formulating a sufficiently satisfactory refractory vitreous ceramic coating material capable of withstanding repeated thermal shock at operating temperatures of about 1800° F. or higher for any extended period of time without undergoing substantial decomposition or deterioration either because of thermal oxidation or from contact with hot and corrosive gases. In addition to these requirements, it is essential that the coating material possess and also be capable of retaining a coefficient of expansion comparable to that of the metal in order to resist flaking and cracking upon deformation of the metal.

It has now been discovered that a stable and non-toxic ceramic coating material particularly suitable for application over stainless steel surfaces may be obtained by utilizing specially formulated frits of the borosilicate type which are alkali- and alumina-free. The frits of the present invention essentially containing the oxides of silicon, boron, strontium, calcium, zinc, cerium, vanadium and titanium processed as a coating material utilizing suitable mill-addition ingredients provide markedly improved high temperature results compared to prior art ceramic coatings in that prolonged protection is afforded the metallic member against oxidation and corrosion at higher temperatures in the absence of chipping, flaking or other forms of deterioration. In addition to these advantages, the formulations possess good workability of the siliceous mass together with solubility characteristics such that the indefinite keeping of a wet-milled ceramic coating slip in a stable condition during storage prior to its use is made possible.

It is therefore an object of this invention to provide a stable refractory vitreous ceramic coating which, when bonded to a stainless steel or nickel alloy surface will effectively protect the same at operating temperatures from 1800 to 1900° F. for extended periods of use.

It is another object of this invention to provide a frit used in preparing such a coating.

It is still another object of this invention to provide articles of manufacture comprising a stainless steel member having bonded thereto a ceramic coating of the type herein disclosed which is alkali- and alumina-free and relatively non-toxic.

Other objects and advantages will become apparent as this specification proceeds.

The frits suitable for use in preparing the ceramic coating materials in accordance with this invention consist of the following ingredients considered on an oxide basis, each constituent being present in an amount within the indicated concentrations based on the total weight of the frit: silicon dioxide ($SiO_2$), 25 to 35%; boron oxide ($B_2O_3$), 12 to 25% strontium oxide (SrO), 15 to 25%; zinc oxide (ZnO), 4 to 6%; calcium oxide (CaO) 3 to 5%; cerium oxide ($CeO_2$), 4 to 6.5%; vanadium oxide $V_2O_5$), 3 to 5%; and titanium dioxide ($TiO_2$), 10 to 20%.

The raw batch materials and the quantities thereof suitable for use in preparing frits within the above compositional ranges are readily determinable by those skilled in the art and include the oxides of the various ingredients as well as substances which are convertible thereto during smelting of the ingredients required for forming the frit. Suitable raw batch materials providing the essential ingredients include quartz ($SiO_2$), boric acid ($H_3BO_3$), strontium carbonate ($SrCo_3$), zinc oxide (ZnO), calcium carbonate ($CaCO_3$), cerium oxide ($CeO_2$), vanadium pentoxide ($V_2O_5$), and titanium dioxide ($TiO_2$). The physical form of the various ingredients used in making the frit is not of extreme importance, it being preferred, however, to use materials in a relatively finely divided form to enable effective mixing during smelting while materially reducing the smelting time which would otherwise be required.

To illustrate this invention with respect to the formulation of a suitable raw batch for yielding a typical frit for use as herein contemplated, the following formula constituting a preferred embodiment and designated as Frit 423 is given. It should be understood, however, that the example is merely illustrative and should in no way be construed as a limitation on the scope of the disclosure.

| Raw Batch Formula (Percent by weight) | | Oxide Composition (Percent by weight) | |
|---|---|---|---|
| Quartz | 24.0 | SiO$_2$ | 30 |
| Boric acid | 24.1 | B$_2$O$_3$ | 17 |
| Strontium carbonate | 22.7 | SrO | 20 |
| Zinc oxide | 4.0 | ZnO | 5 |
| Calcium carbonate | 5.7 | CaO | 4 |
| Cerium oxide | 4.0 | CeO$_2$ | 5 |
| Vanadium pentoxide (90% V$_2$O$_5$) | 3.5 | V$_2$O$_5$ | 4 |
| Titanium dioxide | 12.0 | TiO$_2$ | 15 |
| Total percent | 100.0 | | 100 |

It will be seen from the foregoing that the boro-silicate type frits of this invention are characterized by the presence of from 37 to 60% by weight of the glass-forming components consisting of the oxides of silicon and boron respectively. The balance of the frit composition consisting of from 40 to 63% of the component oxides is made up of strontium, zinc, calcium, cerium, vanadium and titanium. Further additions of titanium dioxide may be added at the mill as hereinafter discussed together with other mill addition ingredients including enamelers clay, water, etc.

With reference to the specific oxide components of the alkali- and alumina-free frit compositions of the present invention, it will be noted that no lead or beryllium compounds are included in the formulations. Though commonly used in prior art frits with lead oxides as a fluxing agent and beryllium oxide as a refractory component, such compounds are highly objectionable due to their marked toxicity and their exclusion is therefore desirable whenever possible. The inclusion of a substantial amount of strontium oxide providing ingredient constitutes an important element of the novel frit compositions herein proposed, the substance being non-toxic and possessing favorable solubility characteristics contributing to the stability of the wet-milled ceramic coating slips prepared with such frits. The calcium and zinc oxide ingredients also serve as fluxes and cerium oxide is added to utilize its properties as a refractory or stable, high melting opacifier. Since cerium oxide is unaffected by furnace atmospheres, its recognized ability to reflect incident radiant energy is retained in the mixture. Vanadium oxide in relatively small quantities is useful both as a glass-former and flux in the frit composition.

By using the ingredients herein set forth within the specified concentration ranges, the fusibility in the batch is maintained such that the incorporation of from 10 to 20% and preferably about 15% by weight of titanium dioxide is made possible with no difficulty. Titanium dioxide increases the fluidity or workability of the glass and imparts turbidity or opacity to the same. It also increases the chemical stability of the frit thereby improving the resistance of the coating material to attack by acids or alkalis. With its use, thermal expansion properties of the glass can be adjusted toward an improved frit of the coating to the metal. There is evidence to indicate that the use of cerium oxide in conjunction with titanium dioxide results in the formation of a stable and heat resistant compound which is presumably cerium titanate, this conclusion being supported by X-ray analysis and also by the development of a characteristic faint yellow color which becomes particularly noticeable after extended periods of heating.

The raw frit batch is compounded by combining the ingredients within the proportions suitable for providing the oxide compositional ranges previously indicated, the material being suitably screened through a 20-mesh sieve, thoroughly mixed and charged to a hot frit smelter. The preferred smelting temperature is about 2500° F., maturity of the melt being indicated by appearance of a smooth surface and the ability to draw a uniform thread of glass from the melt. The smelting requires about one hour at the designated temperature, however, longer or shorter smelting periods may be used depending upon the proportions of materials used in the raw frit batch and the size of the batch. The molten material upon reaching maturity is poured into cold water causing the material to shatter thereby forming the frit. The shattered material is then dried and ground to desired size, suitably to pass a 30 to 40-mesh sieve. Although useful ceramic coatings can be made with the frits of the present invention utilizing only conventional mill addition ingredients including enamelers clay and water, it is preferred to include additional amounts of titanium dioxide as a mill batch formula ingredient for best results. The amount of titanium dioxide used in the mill batch formula may be varied including as much as 20 parts by weight based on per hundred parts of frit used in the mill batch formulation. From 5 to 8 parts and preferably about 7 parts of enamelers clay is adequate and the amount of water may be varied between 40 to 60 parts with from 45 to 50 parts being generally preferred.

Illustrative examples of mill batch formulas suitable for use with the boro-silicate frits herein disclosed are listed below, the formulations being designated as No. 423-1 and 423-2 for purpose of identification. The amount of each component is expressed as parts by weight per 100 parts of frit used in the batch.

*Mill batch formulas (parts by weight)*

| Ceramic Coating No. | 423-1 | 423-2 |
|---|---|---|
| Frit 423 | 100 | 100 |
| Titania | 0 | 15 |
| Enamelers clay | 7 | 7 |
| Water | 40 | 50 |

The mill batch formulas illustrated by those set out above are milled in conventional porcelain ball mills until a desirable degree of fineness is attained, a suitable test thereof ordinarily consisting of passage through a 325-mesh sieve with less than about 5% of the milled material being retained thereby.

Application of the ceramic coatings or slips may be accomplished by spraying, dipping or by any other suitable means, it being necessary to first prepare the metal surface for proper bonding with the ceramic coating material. For this purpose, the metal to be coated is initially heated for about three minutes at 1500 to 1600° F. to remove all oils, greases or other foreign substances adhering to the surface. It is then given a moderately heavy sandblasting to remove all scales and to produce a surface that is clean and preferably slightly roughened since such a surface usually provides the best coating adherence.

When the coating is to be applied by dipping, the consistency of the slip should be adjusted with additions of water (up to 40% on a wet-basis) and/or electrolytes to give a dry-weight pickup equivalent to from 20 to 25 grams on a sandblasted steel plate one foot square (both sides being covered). Such dipping weights will result in a fired coating of from 2 to 2.5 mils in thickness. Where thinner or thicker coatings may be desired, the set and pickup of the coating slip may be either increased or decreased accordingly. The metallic member to be coated is immersed in the adjusted slip, care being exercised to provide complete coverage of the surface or surfaces. It is then removed and set in such a position for draining as to promote a thin uniform coating of all the surfaces to be treated and to facilitate draining of excess coating slip. After draining is complete and excess coating material is removed from the edges of the metal member, the coating should be dried in circulating warm air at about 120° to 150° F. For application of the coating material to the metal member by spraying, the consistency of the slip may be adjusted as desired or necessary in accordance with standard practice.

The coated, drained and dried metal parts are then fired in either an electric furnace or a fuel fired muffle furnace. The firing time and temperature may be varied depending upon factors such as metal thickness, specific coating composition, furnace load, heat capacity of the furnace, etc. Satisfactory maturity of the coatings of the present invention is ordinarily achievd with a firing time of about six minutes and a firing temperature between 1800 to 1900° F. or thereabouts.

A part of the subject matter of this invention is a new article of manufacture comprising a stainless steel or nickel alloy structural member coated with a ceramic coating layer characterized as herein disclosed by the presence of the oxides of silicon, boron, strontium, zinc, calcium, cerium, vanadium and titanium in the frit used in preparing the coating material. The ceramic coatings as previously indicated are especially suitable for adhering to and being retained on stainless steels and the high temperature resistant nickel alloy commonly referred to as "Inconel," the latter containing approximately 15% chromium, 80% nickel and 5% iron by weight. The stainless steels found to be particularly suitable for use include those designated by numbers as 302, 310, 321 and 347 in the nomenclature originated by the American Iron and Steel Institute, the approximate compositions of which are indicated in the following table on a percent by weight basis:

| AISI Type No. | Carbon | Chromium | Nickel | Other Elements | Iron |
|---|---|---|---|---|---|
| 302 | 0.08-0.20 | 16.0-18.0 | 6.0-8.0 | Mn 2% max. | Remainder. |
| (A general utility stainless steel) | | | | | |
| 310 | 0.25 max. | 24.0-26.0 | 19.0-22.0 | Mn 2% max. | Remainder. |
| (For use at elevated temperatures) | | | | | |
| 321 | 0.08 max. | 17.0-19.0 | 8.0-11.0 | Ti min.5×C | Remainder. |
| (An 18-8 type stabilized against intercrystalline corrosion at elevated temperatures) | | | | | |
| 347 | 0.08 max. | 17.0-19.0 | 9.0-12 | Cb 10×C | Remainder. |
| (A stabilized 18-8 for service at elevated temperatures) | | | | | |

The effective life of jet engine turbine or compressor parts either moving or stationary, and burner or afterburner parts, rocket combustion chambers and the like constructed from the aforesaid materials is materially extended when coated as described herein with the refractory vitreous ceramic coating materials constituting the present invention. The effectiveness of representative ceramic coatings applied to the indicated alloys is readily seen from the test data submitted below involving high temperature exposure of the coated materials for the designated periods of time.

| Ceramic Coating No. | Metal on Which Used | Long Heat Protection, Hours at Max. Temp.,°F.[1] | |
|---|---|---|---|
| 423-1 | 310 | 144 | 1,900 |
| 423-1 | 347 | 144 | 1,900 |
| 423-1 | 302 | 120 | 1,800 |
| 423-1 | 321 | 120 | 1,800 |
| 423-2 | 310 | 144 | 1,900 |
| 423-2 | 321 | 144 | 1,900 |

[1] Long heat protection as determined by "Accelerated life tests": These tests are conducted at increasing temperatures. In the first complete cycle, 45 minutes of heating at 1600° F. is followed by 15 minutes of cooling in air. This procedure is followed for 8 hours, after which the specimen is allowed to heat continuously in the furnace for 16 hours. Three such cycles of 24-hour duration constitutes a 72-hour long heat test. At its completion in the accelerated life test, the 24-hour cycle is repeated at successive 100° F. increments of temperature until 2,000° F. is reached or until failure occurs.

While in the foregoing specification a number of specific embodiments have been set forth and various specific details have been given, it will be apparent to those skilled in the art that many of the details can be varied widely without departing from the basic concept of the invention.

This application is a continuation-in-part of our co-pending application, Serial No. 283,525 filed April 21, 1952, now abandoned.

We claim:

1. A frit for making a refractory vitreous ceramic coating material, said frit consisting essentially of:

| | Percent |
|---|---|
| $SiO_2$ | 25 to 35 |
| $B_2O_3$ | 12 to 25 |
| SrO | 15 to 25 |
| ZnO | 4 to 6 |
| CaO | 3 to 5 |
| $CeO_2$ | 4 to 6.5 |
| $V_2O_5$ | 3 to 5 |
| $TiO_2$ | 10 to 20 | based on the total weight of the frit.

2. A frit for making a refractory vitreous ceramic coating material, said frit containing about:

| | Percent |
|---|---|
| $SiO_2$ | 30 |
| $B_2O_3$ | 17 |
| SrO | 20 |
| ZnO | 5 |
| CaO | 4 |
| $CeO_2$ | 5 |
| $V_2O_5$ | 4 |
| $TiO_2$ | 15 |
| Total | 100 | based on the total weight of the frit.

3. A raw batch formula for the frit defined in claim 2, said batch consisting of about:

| | Percent (by weight) |
|---|---|
| Quartz | 24.0 |
| Boric acid | 24.1 |
| Strontium carbonate | 22.7 |
| Zinc oxide | 4.0 |
| Calcium carbonate | 5.7 |
| Cerium oxide | 4.0 |
| Vanadium pentoxide (90%) | 3.5 |
| Titanium dioxide | 12.0 |
| Total | 100.0 |

4. An article of manufacture comprising a stainless steel structural member at least a portion of the surface of which is bonded to a refractory vitreous ceramic coating material prepared from a frit consisting essentially of:

| | Percent |
|---|---|
| $SiO_2$ | 25 to 35 |
| $B_2O_3$ | 12 to 25 |
| SrO | 15 to 25 |
| ZnO | 4 to 6 |
| CaO | 3 to 5 |
| $CeO_2$ | 4 to 6.5 |
| $V_2O_5$ | 3 to 5 |
| $TiO_2$ | 10 to 20 | based on the total weight of the frit.

References Cited in the file of this patent

UNITED STATES PATENTS

| | | |
|---|---|---|
| Re. 22,011 | Kinzie et al. | Jan. 20, 1942 |
| 1,938,691 | Dougherty | Dec. 12, 1933 |
| 2,352,425 | Deyrup | June 27, 1944 |
| 2,396,856 | King | Mar. 19, 1946 |
| 2,414,633 | Bryant | Jan. 21, 1947 |
| 2,475,470 | Bennett et al. | July 5, 1949 |
| 2,588,250 | Kopelman | Mar. 4, 1952 |
| 2,733,158 | Tiede | Nov. 7, 1956 |
| 2,753,271 | Treptow | July 3, 1956 |